(12) United States Patent
Hsu (10) Patent No.: US 7,533,160 B2
(45) Date of Patent: May 12, 2009

(54) PROVISIONING SERVER INFORMATION IN A MOBILE STATION

(75) Inventor: Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 10/368,768

(22) Filed: Feb. 18, 2003

(65) Prior Publication Data

US 2004/0162892 A1 Aug. 19, 2004

(51) Int. Cl.
*G06F 15/177* (2006.01)
(52) U.S. Cl. .................. 709/220; 709/221; 710/8; 710/9
(58) Field of Classification Search ............. 710/8–10; 709/220–222
See application file for complete search history.

(56) References Cited

U.S. PATENT DOCUMENTS

| 6,587,882 B1* | 7/2003 | Inoue et al. ............... 709/227 |
|---|---|---|
| 2002/0006133 A1 | 1/2002 | Kakemizu et al. |
| 2002/0039367 A1* | 4/2002 | Seppala et al. ............ 370/401 |
| 2004/0057442 A1* | 3/2004 | Westman et al. .......... 370/401 |
| 2004/0109459 A1* | 6/2004 | Madour et al. ............ 370/401 |
| 2004/0136358 A1* | 7/2004 | Hind et al. ................ 370/352 |

FOREIGN PATENT DOCUMENTS

| EP | 0938217 | 8/1999 |
|---|---|---|
| WO | 02102107 | 12/2002 |

OTHER PUBLICATIONS

Keith Drage, "SIP and the application of SIP as used in 3GPP," Lucent Technologies, 17 page Powerpoint presentation.
"IP Network Architecture Model for cdma2000 Spread Spectrum Systems,"TSG-S Nam Rev.2.1.0., 3rd Generation Partnership Project 2, Dec. 9, 2002, pp. i-iv & 1-56.
Rosenberg et al,. "SIP Session Initiation Protocol," rfc3261 (SIP).txt, Jun. 2002, pp. 1-269.
Perkins, C., "IP Mobility Support," Oct. 1996 RFC No. 2202.
Droms, R., "Dynamic Host Configuration Protocol," Oct. 1993, RFC No. 1541.
International Search Report-PCT/US04/004602, International Search Authority, European Patent Office, Aug. 16, 2004.
International Preliminary Report on Patentability, PCT/US2004/004602 IPEA/US Sep. 17, 2005.
Written Opinion PCT/US2004/004602, International Searcg Authority European Patent Office, Aug, 18, 2005.

* cited by examiner

*Primary Examiner*—Eron J Sorrell
(74) *Attorney, Agent, or Firm*—Howard Seo; Kristine Ekwueme; Thomas R. Rouse (57) ABSTRACT

Method and apparatus for dynamic provisioning of a Mobile Station (MS) to provide server configuration information. In one embodiment, a home network determines whether to use the visited local network or the home network. An indicator selecting the associated server is transmitted. The server is for session control, such as Session Initiation Protocol (SIP) control of voice over Internet Protocol (IP) communications.

12 Claims, 5 Drawing Sheets

PROVISIONING SERVER INFORMATION IN A MOBILE STATION

BACKGROUND

1. Field

The present invention relates generally to communication systems, and more specifically to provisioning server information for processing Internet Protocol (IP) communications in a wireless communication system.

2. Background

In a wireless communication system supporting mobile Internet Protocol (IP) communications, i.e., communications that include a link to the Internet, a mobile node, referred to herein as a Mobile Station (MS), may use a Dynamic Host Configuration Protocol (DHCP) for communication of configuration information. Generally, the DHCP provides a framework for passing configuration information to hosts on a Transfer Control Protocol (TCP)/IP network. Mobile IP is detailed in RFC No. 2002, entitled "IP Mobility Support," by C Perkins, published October 1996, which is hereby expressly incorporated by reference. DHCP is detailed in RFC No. 1541, entitled "Dynamic Host Configuration Protocol," by R. Droms, published October 1993, which is hereby expressly incorporated by reference.

The MS may use DHCP to dynamically discover specific server access information, such as Proxy-Call State Control Function (P-CSCF) information (i.e., domain names or IP addresses). The P-CSCF is detailed in the 3GPP2 specification entitled "IP Network Architecture Model for cdma2000 Spread Spectrum Systems," having interim reference number TSG-S NAM Rev 2.1.0. A problem exists as the MS may not have configuration information for a visited network, and therefore desires instruction as to which server to use for communications, the home network server or the visited network server.

There is a need therefore for dynamic provisioning of a MS to receive instruction as to the configuration information for server access in a mobile IP communication.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An Access Network (AN) transports data packets between multiple access terminals (ATs). The AN includes network equipment providing connectivity between a packet switched data network and the AT. An AN is similar to a Base Station (BS), while an AT is similar to a Mobile Station (MS).

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
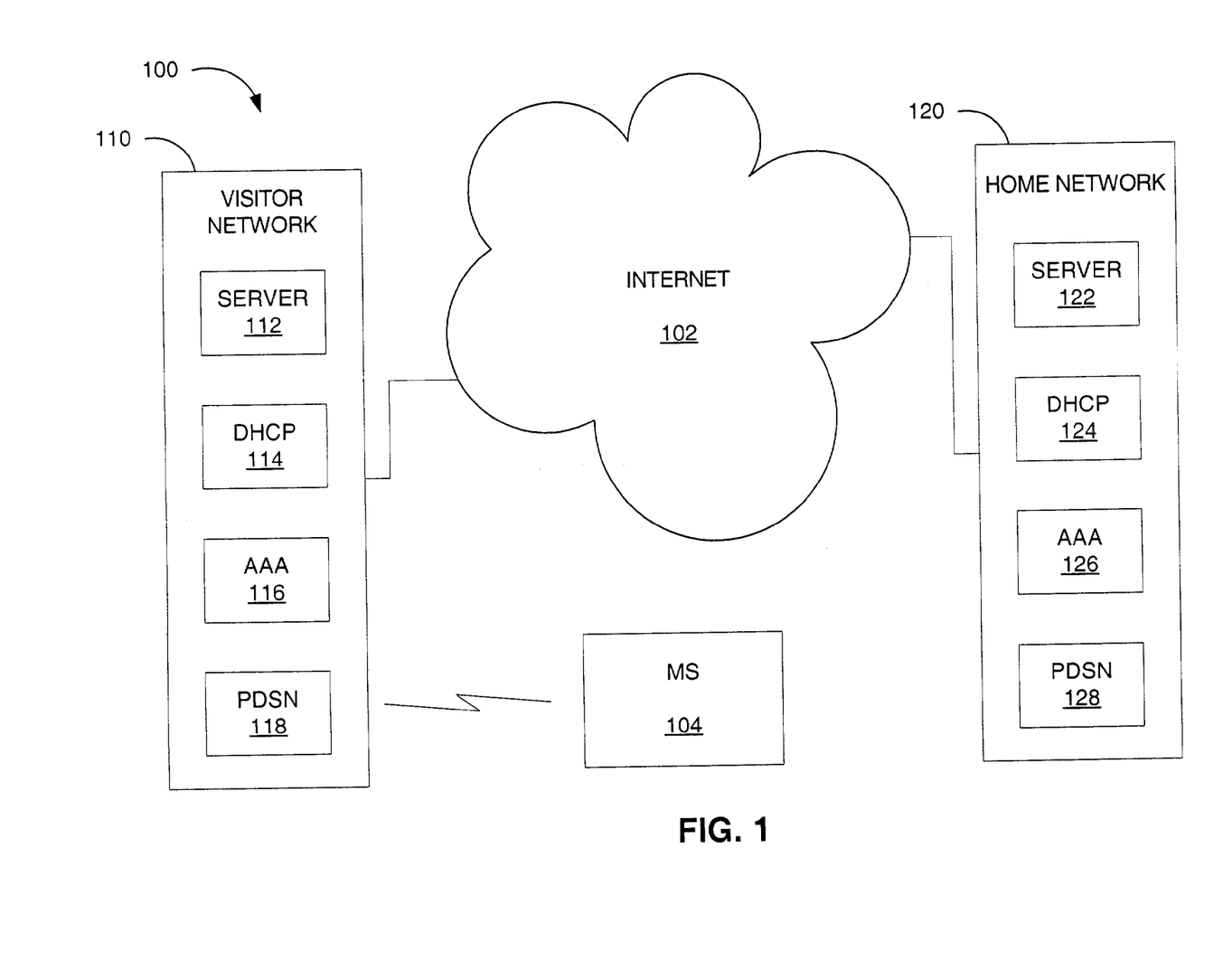
FIG. 1 is a communication system supporting Internet Protocol (IP) communications and wireless communications.

FIG. 1 illustrates a communication system including connections from wireless networks to the Internet. As illustrated, the system 100 accesses the Internet 102 via a home network 120 and/or at least one visited network 110. The home network 120 includes a Home Agent (HA) 128 which processes packet data communications with a Mobile Station (MS) 104 if Mobile IP is used. The HA tunnels datagrams for delivery to the MS 104 when the MS 104 is away from home, and maintains current location information for the MS 104. The home network 120 further includes an Authentication, Authorization and Accounting server 126, which supports a method for Internet user authentication such as Remote Authentication Dial-In User Service (RADIUS).

The MS 104 supports mobile IP, wherein the MS 104 is a mobile node changing point of attachment from one network or subnode to another. The MS 104 may change location without changing IP address; and may continue to communicate with other Internet nodes at any location using a same (constant) IP address, assuming link-layer connectivity to a point of attachment is available.

A Foreign Agent (FA) 118 in the visited network 110 provides routing services to the MS 104 while registered. The FA 118 in the visited network 110 detunnels and delivers datagrams to the MS 104 that were tunneled by the HA 128. For datagrams sent by MS 104, the FA 118 in the visited network 110 may serve as a default router for registered mobile nodes.

Each MS 104 is given a long-term IP address on the associated home network 120. This home address is administered in the same way as a "permanent" IP address is provided to a stationary host. When away from the home network 120, a "care-of address" is associated with the MS 104 and reflects the MS 104 current point of attachment. The MS 104 may use the home address as the source address of all IP datagrams that the MS 104 sends.

A Call State Control Functions (CSCF) controls assignment of resources for IP multimedia services. The P-CSCF is a Proxy-CSCF performed by a first terminal or access point in an IP Multimedia system, such as system 100. An IMS is an All-IP wireless system, where data, voice and signaling are all carried as IP data packets. Basically, the P-CSCF is the MS 104 point of contact in the visited network 110 after registration. The home network 120, however, may instruct the MS 104 to continue to use the CSCF of the home network 120. The P-CSCF supports the Session Initiation Protocol (SIP), which is used for setting up Voice over IP (VoIP), etc. SIP is described in RFC No. 3261, entitled "SIP: Session Initiation Protocol;" by J. Rosenberg et al., published June 2002, which is hereby expressly incorporated by reference. SIP is an application-layer control (signaling) protocol for creating, modifying, and terminating sessions with one or more participants. These sessions include Internet telephone calls, multimedia distribution, and multimedia conferences. There are many applications of the Internet that require the creation and management of a session, where a session is considered an exchange of data between an association of participants. The implementation of these applications is complicated by the practices of participants: users may move between endpoints, they may be addressable by multiple names, and they may communicate in several different media—sometimes simultaneously. Numerous protocols have been authored that carry various forms of real-time multimedia session data such as voice, video, or text message& The Session Initiation Protocol (SIP) works in concert with these protocols by enabling Internet endpoints (called user agents) to discover one another and to agree on a characterization of a session they would like to share. For locating prospective session participants, and for other functions, SIP enables the creation of an infrastructure of network hosts (called proxy servers) to which user agents can send registrations, invitations to sessions, and other requests. SIP is an agile, general-purpose tool for creating, modifying, and terminating sessions that works independently of underlying transport protocols and without dependency on the type of session that is being established.

As described in 3GPP2, the CSCF is a network component that applies only to the Multimedia Domain. The CSCF establishes, monitors, supports, releases Multimedia sessions, and manages the user's service interactions. The CSCF is responsible for: a) managing the allocation of required resources such as announcement servers, multi-party bridges, etc.; b) maintaining knowledge of session states and user's service precedence; c) querying the AAA for authentication information and user profile information; and d) performing session processing tasks (e.g., network selection) required for session completion. The functionality of the CSCF in a roaming situation is split between the visited network and the home network. The CSCF entity in the home network is responsible for session control.

The visited network contains these entities, the Proxy-Call Session Control Function (P-CSCF), and the Emergency-Call Session Control Function (E-CSCF). The P-CSCF is used to proxy requests from the mobile station to a CSCF in the home network and to return responses from the home network to the mobile station. The E-CSCF is used for emergency calls. The terms "visited" and "home" refer to different service providers networks, not to geographical areas. The home network itself may be geographically distributed.

The Multimedia Domain resources and/or services (Media Gateway Control Functions, Media Resource Function Controllers) shall respond only to requests coming from the CSCF or BGCF entity responsible for those resources. The CSCF entity in the home network may be further divided into an Interrogating-Call Session Control Function (I-CSCF) and a Serving-Call Session Control Function (SCSCF). The reason for this could be load sharing and/or hiding of the internal network structure, or for allocation of an S-CSCF close to the mobile station. The I-CSCF would in such a case be the entry point to the network, responsible for locating the S-CSCF serving the user, while the S-CSCF is the entity actually keeping the session state.

The communication between the CSCF and AAA may include the passing of addresses and security tokens necessary for the CSCF to communicate with other CSCF entities. Other techniques may also apply that allow a CSCF to determine the address of another CSCF entity. The CSCF has access to Subscriber Profiles. The CSCF uses information from various databases (e.g., subscriber profile) and invocation of various services applications to determine the exact service being requested.

As discussed hereinabove, DHCP provides a framework for passing configuration information to hosts on a TCP/IP network. The Dynamic Host Configuration Protocol (DHCP) provides configuration parameters to Internet hosts. DHCP consists of two components: a protocol for delivering host-specific configuration parameters from a DHCP server to a host and a mechanism for allocation of network addresses to hosts.

DHCP is built on a client-server model, wherein the designated DHCP server hosts allocate network addresses and deliver configuration parameters to dynamically configured hosts. In this context, the term "server" refers to a host providing initialization parameters through DHCP, and the term "client" refers to a host requesting initialization parameters from a DHCP server.

A host should not act as a DHCP server unless explicitly configured to do so by a system administrator. DHCP supports three mechanisms for IP address allocation. In "automatic allocation", DHCP assigns a permanent IP address to a host. In "dynamic allocation", DHCP assigns an IP address to a host for a limited period of time (or until the host explicitly relinquishes the address). In "manual allocation", a host's IP address is assigned by the network administrator, and DHCP is used simply to convey the assigned address to the host. A particular network will use one or more of these mechanisms, depending on the policies of the network administrator.

Dynamic allocation is the only one of the three mechanisms that allows automatic reuse of an address that is no longer needed by the host to which it was assigned. Thus, dynamic allocation is particularly useful for assigning an address to a host that will be connected to the network only temporarily or for sharing a limited pool of IP addresses among a group of hosts that do not need permanent IP addresses. Dynamic allocation may also be a good choice for assigning an IP address to a new host being permanently connected to a network where IP addresses are sufficiently scarce that it is important to reclaim them when old hosts are retired. Manual allocation allows DHCP to be used to eliminate the error-prone process of manually configuring hosts with IP addresses in environments where (for whatever reasons) it is desirable to manage IP address assignment outside of the DHCP mechanisms.

The DHCP method is complementary to methods of provisioning static P-CSCF information in the MS. The MS may first try to use DHCP to discover P-CSCF information. If it fails due to reasons such as the network doesn't support DHCP, the MS may fall back to using the statically-provisioned P-CSCF information. Statically-provisioned methods include manually provisioning the MS with information (e.g., IP addresses) of all P-CSCFs of the all roaming partners. Another method of static provisioning is relying on the over-the-air provisioning.

Dynamic provisioning of the MS is desired, wherein the MS sends a DHCP request and the DHCP reply includes the IP address of the desired P-CSCF server. Returning to FIG. 1, the home network 120 includes a DHCP server 124, and a server 122, which may be a CSCF or a P-CSCF server. The home network 120 is linked to the Internet 102. Similarly, the visited network 110 includes a PDSN 118, an AAA server 116, a DHCP server 114, and a server 112, which may be a CSCF or a P-CSCF server. In other words, servers 112,122 are servers for implementing SIP functionality.

When the MS 104 moves from the home network 120 into the visited network 110, the MS 104 sends a DHCP request message. In response, the DHCP server sends a relay message including the IP address of the corresponding P-CSCF. According to one embodiment, the DHCP server provides a relay message including the IP address of the designated P-CSCF server. The home network 120 determines the designated P-CSCF server.

The following details a variety of ways for the MS to obtain P-CSCF information dynamically via DHCP. Before using the DHCP method, the MS has already established a packet data session and obtained an IP address. Thus, the DHCP method described herein is not for assigning MS's IP address.

Referring to FIG. 1, while the MS 104 is roaming, the MS 104 may use a P-CSCF in the visited network 110 or in the home network 120. The decision of which P-CSCF to use is determined by the home network 120. The decision may be based on a pre-arranged agreement between the visited and home carriers, user profile information, local policy, etc. For example, a home carrier may have a roaming agreement wherein subscribers entering a visited carrier are required to use the P-CSCF provided by the home carrier. In another example, a visited carrier may have the local policy that all SIP calls, including those made by roaming MS, are to be processed by the local P-CSCF in the visited carrier. Yet another example, the visited network 110 receives user profile information from the home AAA server 122 during access authentication, which contains user preference regarding which P-CSCF to use. If there is conflict, it is up to the local policy to determine which one to use. The network-based decision also has the advantage in the MS 104 to use a unified behavior to obtain the P-CSCF information (e.g., IP address of the P-CSCF) in either the visited carrier or the home carrier.

Figure 2:
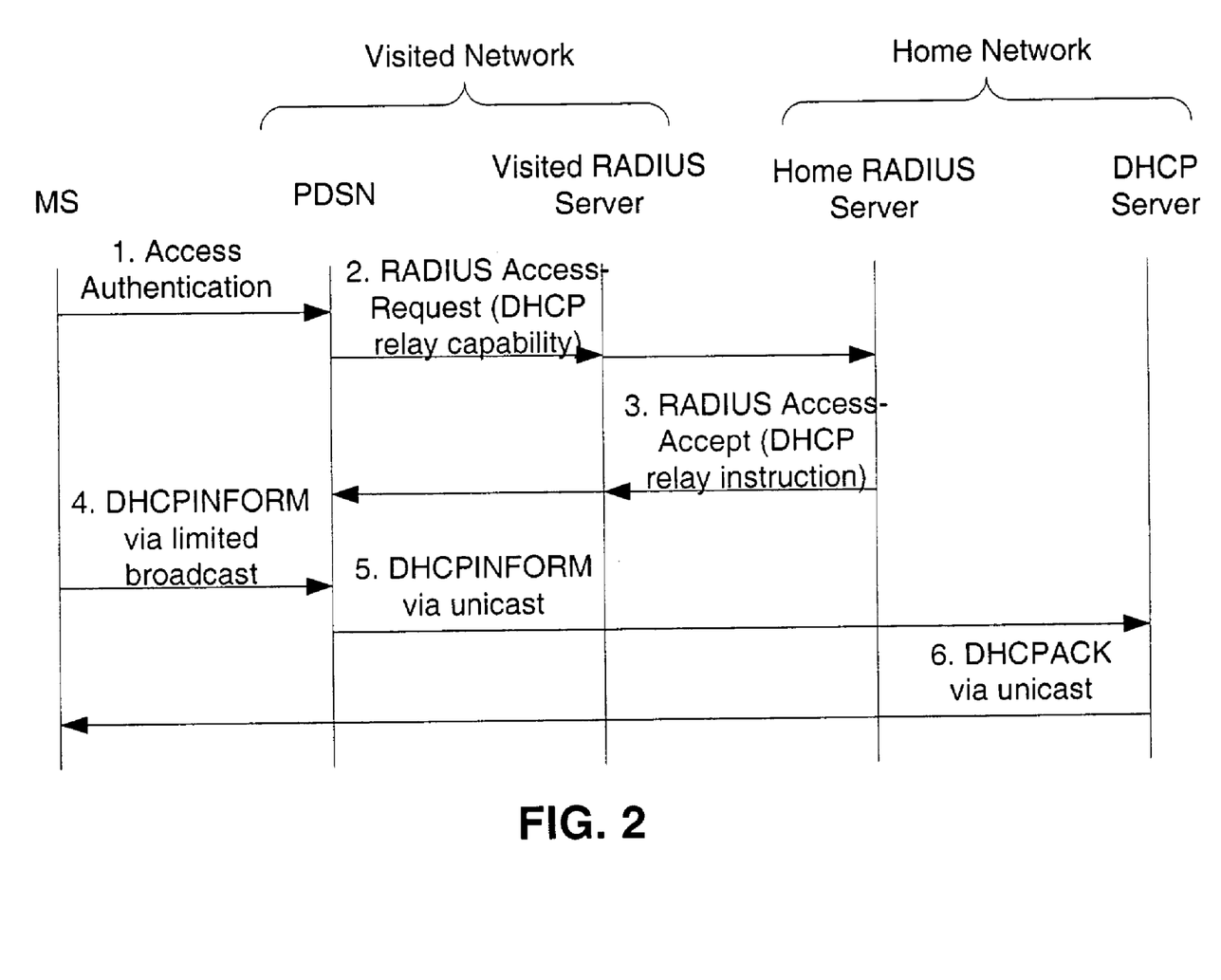
FIG. 2 is a timing diagram for dynamic provisioning of a Mobile Station (MS) with Session Initiation Protocol (SIP) configuration information.

FIG. 2 is a timing diagram illustrating one scenario, wherein communications are processed between a MS 104, the home network 120, and a visited network 110. The home network 120 includes a home RADIUS server 126, and a DHCP server 124. The visited network 110 includes a PDSN 118 and a visited RADIUS server 116. The MS 104 roams into the visited network 110 and sends an access authentication. The MS 104 uses a DHCPINFORM message to request configuration parameters. Since the MS 104 already has an IP address, the MS includes its address in a "Client IP Address" field of the DHCPINFORM. The MS generally is not configured with a DHCP server's IP address, thus, the MS sends DHCPINFORM via IP broadcast, such as on a UDP port (67). The MS may use a limited IP broadcast (i.e., 255.255.255.255) instead of a directed IP broadcast. For a directed IP broadcast the message is sent individually to all MSs associated with the home network. Note that the firewall of the MS's home carrier most likely will discard any directed IP broadcast packets unless Mobile IP reverse tunnel is used to tunnel the directed IP broadcast messages back to the MS's HA.

The DHCPINFORM may be received by multiple DHCP servers, wherein each replies with DHCPACK acknowledge messages. If these replies contain different P-CSCF information, it is up to the MS to decide which one to use.

While roaming, a MS using Simple IP sends the DHCPINFORM. Upon receiving the DHCPINFORM, the PDSN relays it to a local DHCP server in the visited network or a remote DHCP server in the MS's home network. The relay decision is based on the pre-arranged agreement with the MS's home network, or MS's user profile, or local policy:

If the MS's home carrier has a roaming agreement with the visited carrier to use a local P-CSCF to serve the roaming MS, the PDSN relays the DHCPINFORM to a local DHCP server. The PDSN relays the DHCPINFORM either via: 1) limited IP broadcast to a local network that has one or more DHCP servers; or 2) unicast to a default local DHCP server. The PDSN does not relay the DHCPINFORM to any MS.

If the MS's home carrier has a roaming agreement with the visited carrier to relay DHCPINFORM back to the home carrier, the PDSN needs to be provisioned with the appropriate DHCP relay instruction, i.e., the mapping between the home carrier's domain name and at least one IP address of the remote DHCP server.

If the pre-arranged DHCP relay agreement is not practical and available (due to logistic or other reasons), an alternative is for the PDSN to obtain the relay instruction as a user profile from the MS's home RADIUS server. During the MS access authentication, the PDSN may indicate to the home RADIUS server about its DHCP Relay Agent capability. This indication can be conveyed in a 3GPP2 vendor-specific attribute in the RADIUS Access-Request message. Then, the home RADIUS server may inform the PDSN about the DHCP relay instruction for that particular MS. The instruction can be included in a 3GPP2 vendor-specific attribute in the RADIUS Access-Accept message. The instruction tells the PDSN to use a local DHCP server or relay the DHCPINFORM to a remote DHCP server. In the latter case, the instruction also contains at least one IP address of the remote DHCP server.

In the absence of any DHCP relay instruction from pre-arranged agreement or user profile, the PDSN relays the DHCPINFORM to a local DHCP server. The PDSN must not relay the DHCPINFORM to any MS.

For roaming MS using Mobile IP, if reverse tunnel is enabled, according to IS-835-B the PDSN forwards all limited broadcast IP packets (including those carrying DHCPINFORM) to the MS's HA. This forces the MS to communicate with a DHCP server. If reverse tunnel is not enabled for the MS, the PDSN acts as a DHCP Relay Agent, and the behavior is the same as in the case of Simple IP. That is, the PDSN relays the DHCPINFORM to a local or remote DHCP server based on the pre-arranged agreement with MS's home network, or MS's user profile, or local policy.

If reverse tunnel is enabled, the HA may receive limited broadcast IP packets carrying DHCPINFORM. The PDSN relays the DHCPINFORM either via limited IP broadcast to a local network that has one or more DHCP servers or via unicast to a default local DHCP server.

According to mobile IP, the MS may request the HA to forward any broadcast or multicast IP packets to the MS. The MS requests this feature by enabling the B-bit in the Mobile IP Registration Request. When the HA receives a broadcast IP packet or a multicast IP. packet (destined for a group where the MS is a member), the HA encapsulates the packet in another IP packet destined for the MS's home address and then tunnels the encapsulated packet to the PDSN. It is not desirable, however, for the HA to forward broadcast IP packet containing DHCPINFORM to any MS, because air resource is wasted to transport DHCPINFORM to MS that actually doesn't care about DHCPINFORM. A possible solution is to mandate the HA not to forward any broadcast IP packets (indicating carrying DHCP messages) to those MSs that want to receive broadcast packets from the HA.

The DHCP server replies with DHCPACK to the MS via a unicast IP packet. The DHCP server knows the MS's IP address from the "Client IP Address" field of the DHCPINFORM. Therefore, the PDSN doesn't need to "relay" the DHCPACK; instead, the PDSN simply routes the DHCPACK as any other packets.

The DHCPACK contains the SIP Server DHCP Option that conveys the information (i.e., domain name or IP address) of at least one P-CSCF. If the option conveys more than one P-CSCF, the MS must use the P-CSCF information in the order listed. If the MS receives the domain name of a P-CSCF, the MS uses DNS to obtain the P-CSCF's IP address. The MS is configured with a DNS Server's IP address or dynamically obtains it via IPCP.

A local DHCP server in the visited network may reply with the information of a P-CSCF in the MS's home network. This can be arranged via roaming agreement and is useful for a roaming Simple IP MS to be notified about the information of a P-CSCF in its home network. Simple IP means that the MS, when initiating a packet data session, obtains an IP address assigned by the local network currently serving the MS. Simple IP doesn't provide IP mobility as in Mobile IP, because the MS using Simple IP is required to obtain a new IP address when it moves to a new network.

A DHCP server in the home network may reply with the information of a P-CSCF in a serving visited network. This may be useful for a roaming Mobile IP MS, with reverse tunnel enabled, to be notified about the information of a P-CSCF in the serving visited network.

Note that the DHCP server in the home network does not know which visited network is serving the MS, and therefore, the DHCPINFORM does not identify the visited network. Additionally, using a local P-CSCF causes an undesirable trumping effect on mobile-originated packets. Specifically, the SIP INVITE from the MS is reverse-tunneled to the MS's HA in the home network and then routed back to the P-CSCF in the visited network. This excessive routing incurs latency in SIP call set-up.

When the home network determines to maintain the P-CSCF at the home network, the visited network then acts as a bit pipe without control and/or flexibility. In contrast, when the determination is to maintain the P-CSCF at the visited network, the visited network achieves control and flexibility. This allows the visited network to calculate charges, control signaling, such as to prohibit VoIP during peak usage hours, etc.

Note that the visited network may not have P-CSCF capability, in which case the home network will maintain P-CSCF control for the communication.

Roaming Simple IP MS Using P-CSCF in Home Network

In this example, the visited network PDSN relays the DHCPINFORM to a remote DHCP server in the MS home network based on the DHCP relay instruction received from the MS's home RADIUS server during MS access authentication. The DHCP relay includes the address of the DHCP home server. As a result, the MS discovers a remote P-CSCF in the home network. Referring again to FIG. 2, at step 1, the MS performs access authentication (CHAP for Simple IP, or FA Challenge/Response for Mobile IP). At step 2, the access authentication triggers the PDSN to send the RADIUS Access-Request to the MS's home RADIUS server via the visited RADIUS server. The RADIUS Access-Request contains a 3GPP2 vendor-specific attribute indicating that the PDSN has DHCP Relay Agent capability.

At step 3, upon successful authentication, the home RADIUS server replies with the RADIUS Access-Accept that contains a 3GPP2 vendor-specific attribute conveying DHCP relay instruction for that particular MS. The instruction is to relay DHCPINFORM to a DHCP server in the home network and contains the IP address of a remote DHCP server.

At step 4, the MS wants to discover a P-CSCF via DHCP and sends DHCPINFORM via limited IP broadcast. The MS includes its IP address in the "Client IP Address" field of the DHCPINFORM.

At step 5, based on the DHCP relay instruction received in step 3, the PDSN relays the DHCPINFORM via unicast to a DHCP server in the home network.

At step 6, the DHCP server sends DHCPACK to the MS via unicast. The DHCP server knows the MS's IP address from the "Client IP Address" field of the DHCPINFORM. The DHCPACK contains information (IPv4 address or domain name) of a P-CSCF in the MS's home network. The DHCPACK identifies the IP address of the P-CSCF. If the determination is to maintain P-CSCF at the home network, then the DHCPACK gives the IP address of the home DHCP. The DHCP relay instruction indicates to the PDSN which DHCP server to use, which implies the same network P-CSCF. The DHCP relay could include an indicator, such as a one bit indicator, wherein if the indicator bit is set the MS uses the home network and if cleared uses the visited network.

Figure 3:
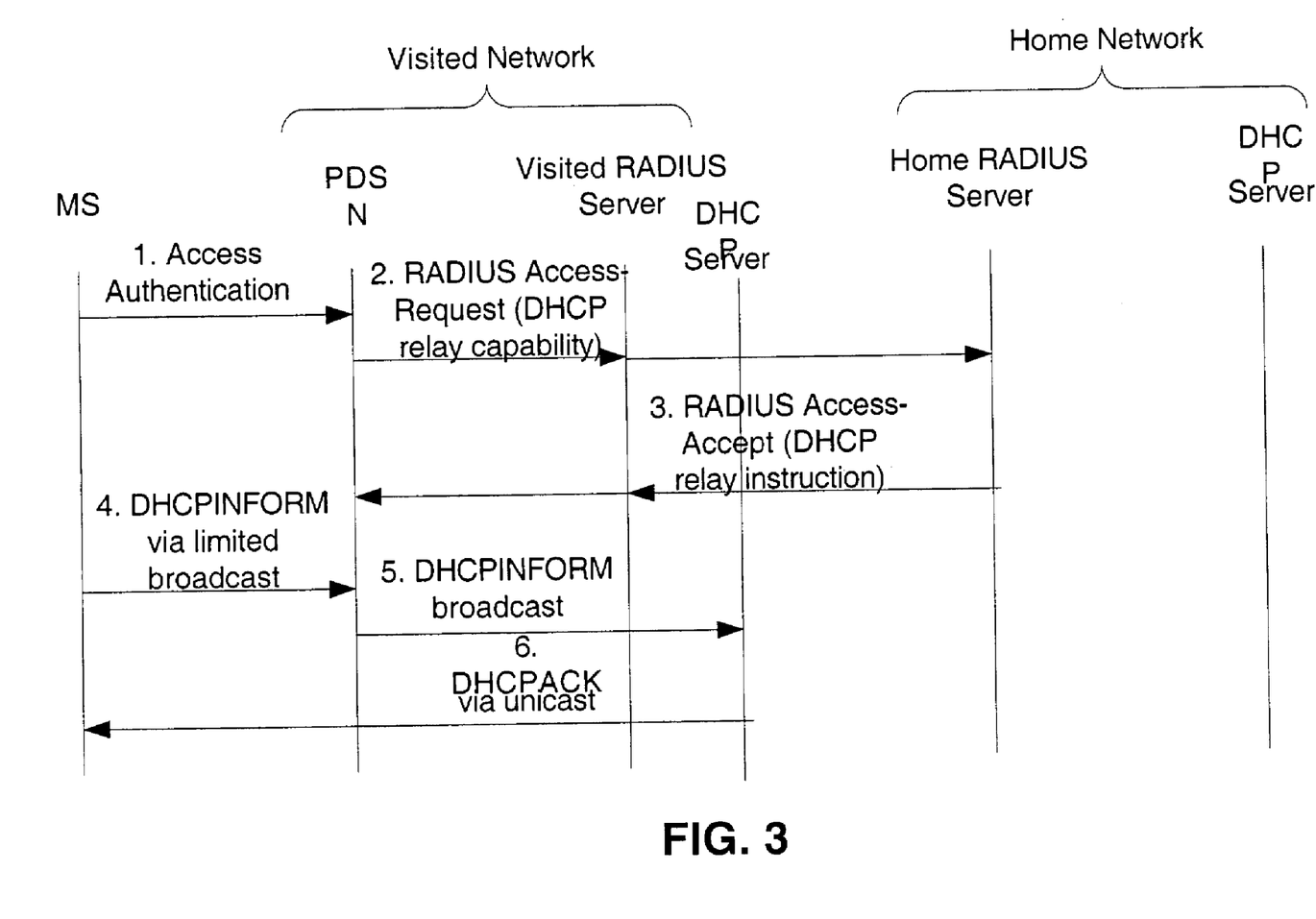
FIG. 3 is a timing diagram for dynamic provisioning of a Mobile Station (MS) with Session Initiation Protocol (SIP) configuration information.

In contrast, if the determination is to use the P-CSCF at the local visited network, then the FIG. 3 illustrates a similar scenario, wherein the DHCP server in the visited network responds to the DHCPINFORM message with a DHCPACK via broadcast, wherein the DCHP server provides the IP address of the P-CSCF of the visited network. Note that if the visited network does not have P-CSCF capability, then the RADIUS access request of step 2 so indicates. In other words, the access request indicates the capability of the network. This is done with two fields: DHCP capability of the PDSN; and P-CSCF capability of the visited network. If the PDSN does not have DHCP capability then the DHCPINFORM message is dropped as the PDSN is not able to respond.

Roaming Simple IP MS Using P-CSCF in Visited Network

Figure 4:
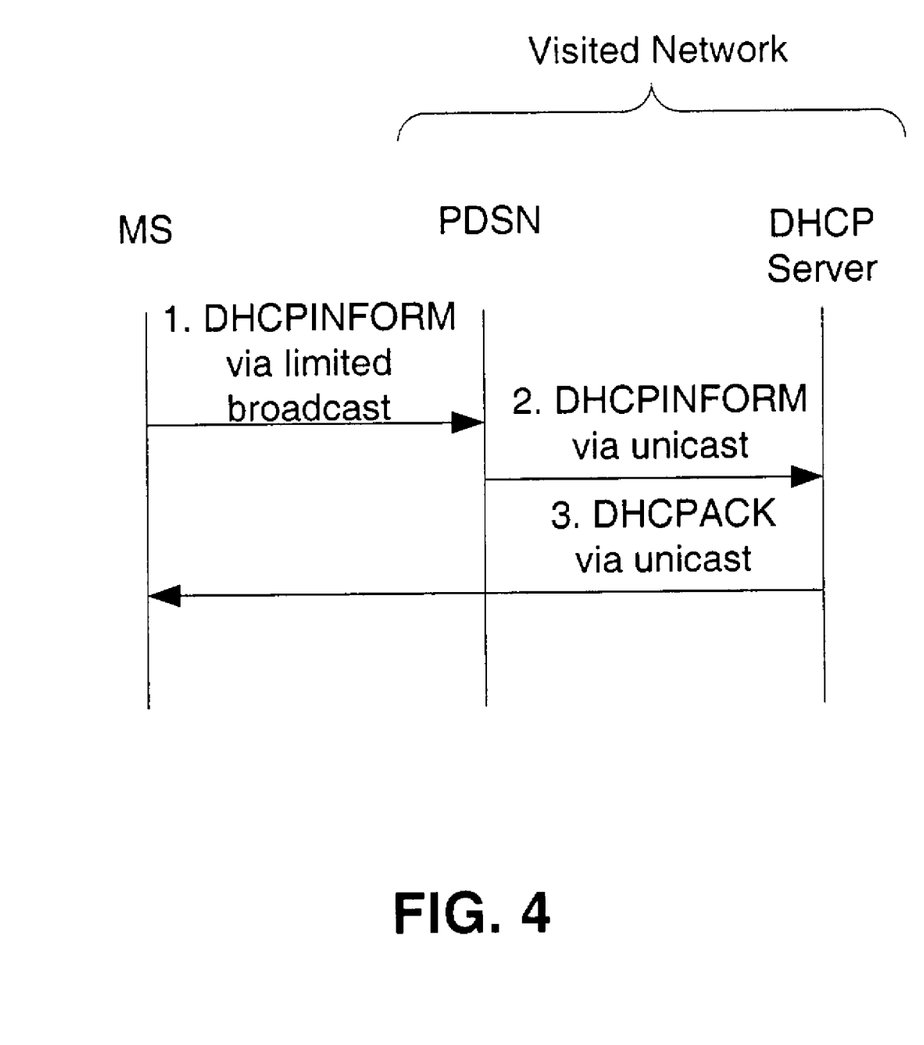
FIG. 4 is a timing diagram for dynamic provisioning of a Mobile Station (MS) with Session Initiation Protocol (SIP) configuration information.

In this example, the PDSN relays the DHCPINFORM to a local DHCP server in the absence of any DHCP relay instructions. As a result, the MS discovers a local P-CSCF in the visited network.

With respect to FIG. 4, at step 1 the MS wants to discover a P-CSCF via DHCP and sends DHCPINFORM via limited IP broadcast. The MS includes its IP address in the "Client IP Address" field of the DHCPINFORM.

At step 2, due to absence of any DHCP relay instruction (from pre-arranged agreement with the MS's home network or user profile from the MS's home RADIUS server), the PDSN relays the DHCPINFORM via unicast to a DHCP server in the home network. This example assumes that the PDSN is provisioned with the IP address of a local DHCP server.

At step 3, the DHCP server sends DHCPACK to the MS via unicast IP packet. The DHCP server knows the MS's IP address from the "Client IP Address" field of the DHCPINFORM. The DHCPACK contains information (IPv4 address or domain name) of a P-CSCF in the visited network.

Roaming MS Using Mobile IP with Reverse Tunnel

Figure 5:
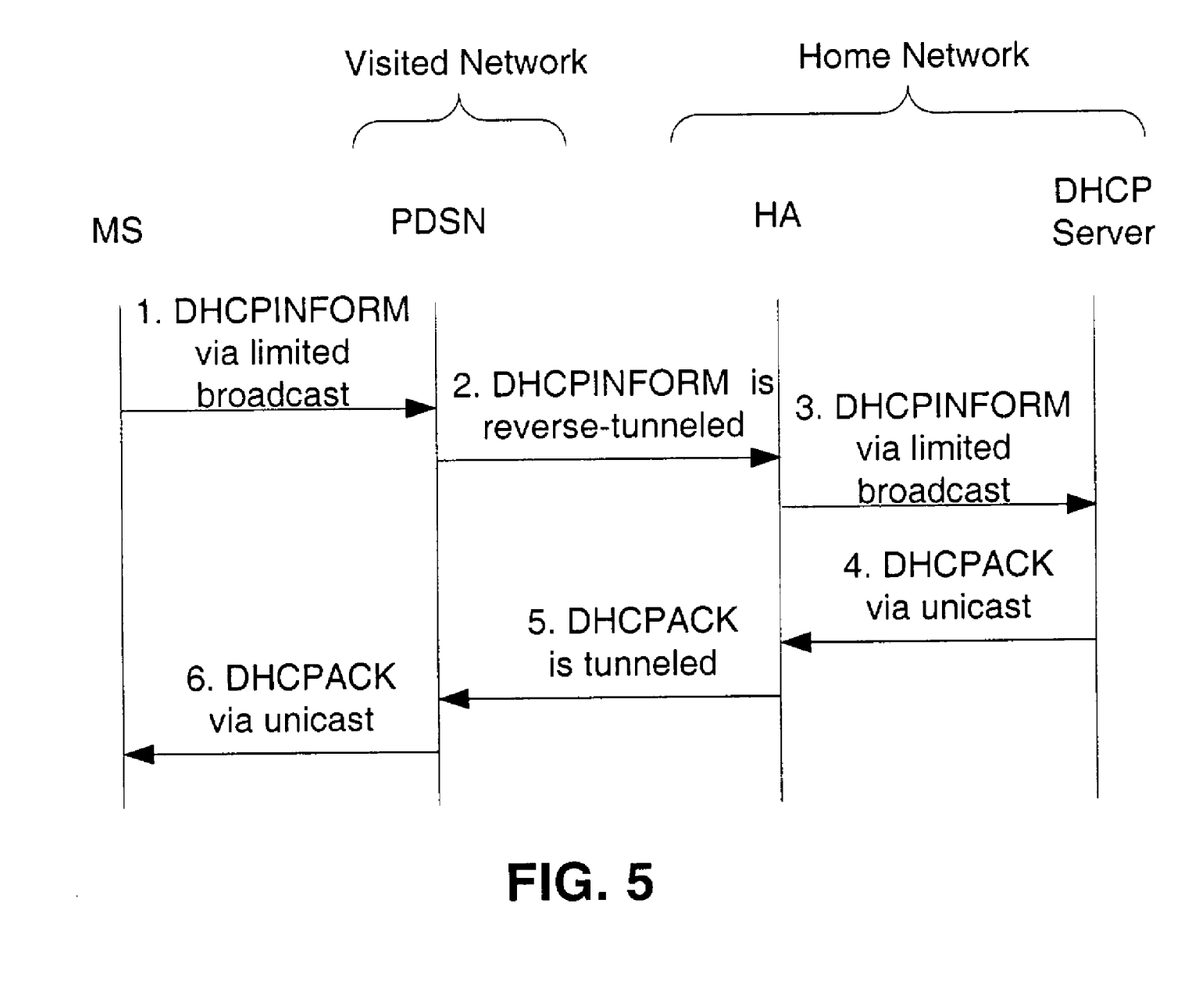
FIG. 5 is a timing diagram for dynamic provisioning of a Mobile Station (MS) with Session Initiation Protocol (SIP) configuration information.

As illustrated in FIG. 5, the MS uses Mobile IP, and the reverse tunnel is enabled. Thus, the PDSN is required to forward all limited broadcast IP packets (including DHCPINFORM) to the MS's HA. This effectively forces the MS to communicate with a DHCP server and hence a P-CSCF in the home network.

At step 1, the MS wants to discover a P-CSCF via DHCP and sends DHCPINFORM via limited IP broadcast. The MS includes its IP address in the "Client IP Address" field of the DHCPINFORM.

At step 2, according to IS-835-B, if reverse tunnel is enabled, the PDSN is required to forward all limited broadcast IP packets to the MS's HA. At step 3, the HA forwards the limited broadcast IP packet (containing the DHCPINFORM) to the HA's local network.

At step 4, the DHCP server sends DHCPACK to the MS via unicast. The DHCP server knows the MS's IP address from the "Client IP Address" field of the DHCPINFORM. The DHCPACK contains information (IPv4 address or domain name) of a P-CSCF in the MS's home network. The unicast IP packet carrying the DHCPACK is routed to the MS's HA.

At step 5, the HA tunnels the unicast IP packet carrying the DHCPACK to the PDSN. At step 6, the PDSN forwards the unicast IP packet carrying the DHCPACK to the MS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method in a wireless communication system for dynamically provisioning a mobile station in a visited network, comprising:
    establishing a communication session through said visited network using an IP address;
    determining to access a multimedia service, wherein the determining comprising steps of:
    ending a DHCP (Dynamic Host Configuration Protocol) request including said IP address via limited broadcast through said visited network;
    receiving via unicast through said visited network a DHCP response which includes server information indicating whether said multimedia service is supported in each of said visited network and home network of said mobile station; and
    selecting a P-CSCF (proxy call state control function) associated with one of said visited and home networks for accessing said multimedia service based on said DHCP response.

2. The method as in claim 1 wherein said server information includes P-CSCF (Proxy-Call State Control Function) information from said visited and home networks.

3. The method as in claim 2 wherein said selecting is based on information selected from a group consisting of pre-arranged agreement between said visited and home network, user profile information, and local policy.

4. A remote station apparatus, comprising:
    a control processor for executing computer-readable instructions; and
    memory storage device for storing computer-readable instructions for:
    establishing a communication session through a visited network using an IP address;
    determining to access a multimedia service, wherein the determining comprising steps of:
    sending a DHCP (Dynamic Host Configuration Protocol) request including said IP address via limited broadcast through said visited network;
    receiving via unicast through said visited network a DHCP response which includes server information indicating whether said multimedia service is supported in each of said visited network and the home network of said mobile station apparatus; and
    selecting a P-CSCF (proxy-call state control function) associated with one of said visited and home networks for accessing said multimedia service based on said DHCP response.

5. The apparatus as in claim 4 wherein said server information includes P-CSCF (Proxy-Call State Control Function) information from said visited and home networks.

6. The apparatus as in claim 5 wherein said selecting in said computer-instructions is based on information selected from a group consisting of pre-arranged agreement between said visited and home network, user profile information, and local policy.

7. A remote station comprising:
a processor for establishing a communication session through a visited network using an IP address;
means for determining to access a multimedia service, comprising:
means for sending a DHCP (Dynamic Host Configuration Protocol) request including said IP address via limited broadcast through said visited network;
means for receiving via unicast through said visited network a DHCP response which includes server information indicating whether said multimedia service is supported in each of said visited network and home network of said remote station; and
means for selecting a P-CSCF (proxy call state control function) associated with one of said visited and home networks for accessing said multimedia service based on said DHCP response.

8. The remote station as in claim 7 wherein said sewer information includes P-CSCF (Proxy-Call State Control Function) information from said visited and home networks.

9. The remote station as in claim 8 wherein said means for selecting is based on information selected from a group consisting of pre-arranged agreement between said visited and home network, user profile information, and local policy.

10. A method in a wireless communication system for dynamically provisioning a mobile station, comprising:
receiving via a limited broadcast, a DHCP (Dynamic Host Configuration Protocol) request from the mobile station;
determining one or more relay instructions associated with the mobile station;
relaying the DHCP request to one of a visited network and a home network associated with the mobile station based on the relay instructions; and
transmitting via unicast through the visited network, a DHCP response to the mobile station that identifies at least one P-CSCF (proxy call state control fUnction) associated with one of said visited network and said home network.

11. A program recorded on a computer readable medium and executable by a computer for dynamically provisioning a mobile station in a visited network, comprising the steps of:
establishing a communication session through said visited network using an IP address;
determining to access a multimedia service, wherein the determining comprising steps of:
sending a DHCP (Dynamic Host Configuration Protocol) request including said IP address via limited broadcast through said visited network;
receiving via unicast through said visited network a DHCP response which includes server information indicating whether said multimedia service is supported in each of said visited network and home network of said mobile station; and
selecting a P-CSCF (proxy call state control function) associated with one of said visited and home networks for accessing said multimedia service based on said DHCP response.

12. A program recorded on a computer readable medium and executable by a computer for dynamically provisioning a mobile station in a visited network, comprising the steps of:
receiving via a limited broadcast, a DHCP (Dynamic Host Configuration Protocol) request from the mobile station;
determining one or more relay instructions associated with the mobile station;
relaying the DHCP request to one of a visited network and a home network associated with the mobile station based on the relay instructions; and
transmitting via unicast through the visited network, a DHCP response to the mobile station that identifies at least one P-CSCF (proxy call state control function) associated with one of said visited network and said home network.

* * * * *

UNITED STATES PATENT AND TRADEMARK OFFICE
CERTIFICATE OF CORRECTION

PATENT NO. : 7,533,160 B2
APPLICATION NO. : 10/368768
DATED : May 12, 2009
INVENTOR(S) : Hsu

It is certified that error appears in the above-identified patent and that said Letters Patent is hereby corrected as shown below:

Column 10, line 28, claim 1: "ending a" to read as --sending a--

Column 11, line 26, claim 8: "said sewer" to read as --said server--

Column 12, line 3, claim 10: "fUnction" to read as --function--

Signed and Sealed this
Thirty-first Day of May, 2011

David J. Kappos
*Director of the United States Patent and Trademark Office*